(12) United States Patent
Hermange (10) Patent No.: US 12,304,173 B2
(45) Date of Patent: May 20, 2025

(54) CONNECTION ASSEMBLY, HAVING A COMPOSITE PANE AND A FUNCTIONAL ELEMENT

(71) Applicant: SAINT-GOBAIN GLASS FRANCE, Courbevoie (FR)

(72) Inventor: François Hermange, Aachen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 493 days.

(21) Appl. No.: 17/794,188

(22) PCT Filed: Feb. 5, 2021

(86) PCT No.: PCT/EP2021/052873
§ 371 (c)(1),
(2) Date: Jul. 20, 2022

(87) PCT Pub. No.: WO2021/156481
PCT Pub. Date: Aug. 12, 2021

(65) Prior Publication Data
US 2023/0042634 A1 Feb. 9, 2023

(30) Foreign Application Priority Data
Feb. 7, 2020 (EP) .................................... 20156248

(51) Int. Cl.
*B32B 17/10* (2006.01)
(52) U.S. Cl.
CPC .. *B32B 17/10036* (2013.01); *B32B 17/10504* (2013.01)

(58) Field of Classification Search
CPC ................................................ B32B 17/10036
See application file for complete search history.

(56) References Cited

U.S. PATENT DOCUMENTS

2018/0173035 A1* 6/2018 Port ......................... E06B 9/24
2018/0301832 A1 10/2018 Coakley et al.
2022/0019114 A1* 1/2022 Friedman ................ B32B 5/024

FOREIGN PATENT DOCUMENTS

| CN | 106465487 A | 2/2017 |
| CN | 109073928 A | 12/2018 |
| CN | 109874319 A | 6/2019 |
| CN | 110023081 A | 7/2019 |

(Continued)

OTHER PUBLICATIONS

International Search Report as issued in International Patent Application No. PCT/EP2021/052873, dated Apr. 14, 2021.

(Continued)

*Primary Examiner* — Edmond C Lau
(74) *Attorney, Agent, or Firm* — Pillsbury Winthrop Shaw Pittman LLP (57) ABSTRACT

A connection assembly includes a composite pane composed of a first pane and a second pane, which are connected to an intermediate layer, and an electro-optical functional element having an active layer arranged between two surface electrodes, which electro-optical functional element is arranged between the first pane and the second pane, wherein in each case a single flexible bus bar in the form of a strip is applied on the two surface electrodes, wherein the bus bar is folded over and routed out of the composite pane.

15 Claims, 3 Drawing Sheets

(56) References Cited

FOREIGN PATENT DOCUMENTS

| | | |
|---|---|---|
| CN | 110418713 A | 11/2019 |
| DE | 93 13 394 U1 | 10/1993 |
| DE | 42 35 063 A1 | 4/1994 |
| DE | 199 60 450 C1 | 5/2001 |
| DE | 20 2004 019286 U1 | 4/2006 |
| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 20 2008 017611 U1 | 4/2010 |
| DE | 10 2013 001334 A1 | 7/2014 |
| EP | 0 876 608 B1 | 4/2002 |
| EP | 0 847 965 B1 | 10/2004 |
| JP | S62-13060 A | 1/1987 |
| JP | S63-177587 A | 7/1988 |
| JP | H07-50378 A | 2/1995 |
| JP | 2002-281645 A | 9/2002 |
| JP | 2013-240940 A | 12/2013 |
| JP | 2018-058747 A | 4/2018 |
| KR | 10-2015-0043428 A | 4/2015 |
| WO | WO 2011/033313 A1 | 3/2011 |
| WO | WO 2012/052315 A1 | 4/2012 |
| WO | WO 2014/019780 A1 | 2/2014 |
| WO | WO 2014/029536 A1 | 2/2014 |

OTHER PUBLICATIONS

Notice of Reasons for Rejection as issued in Japanese Patent Application No. 2022 547240, dated Aug. 8, 2023.
Notice of Preliminary Rejection as issued in Korean Patent Application No. 10-2022-7029705, dated Oct. 18, 2024.

\* cited by examiner

CONNECTION ASSEMBLY, HAVING A COMPOSITE PANE AND A FUNCTIONAL ELEMENT

CROSS-REFERENCE TO RELATED APPLICATIONS

This application is the U.S. National Stage of PCT/EP2021/052873, filed Feb. 5, 2021, which in turn claims priority to European patent application number 20 156 248.5 filed Feb. 7, 2020. The content of these applications are incorporated herein by reference in their entireties.

The invention relates to a connection assembly having a composite pane and an electro-optical functional element, a method for production thereof, and use thereof.

Flexible flat conductors, also called ribbon conductors or foil conductors, are widely used in vehicle construction, in particular to enable movable, electrical contacting under limited space conditions.

In the vehicle sector, flat conductors are used, for example, for contacting electrically functional layers in composite glass panes. Examples are found in DE 42 35 063 A1, DE 20 2004 019 286 U1, or DE 93 13 394 U1.

Such composite glass panes generally consist of at least two rigid individual glass panes that are adhesively bonded to one another surface-to-surface by a thermoplastic adhesive layer. The thickness of the adhesive layer is, for example, 0.76 mm. Additionally, situated between the individual glass panes are electrically functional layers such as heating coatings and/or antenna elements, which are connected to a flat conductor. A flat conductor suitable for this purpose has a total thickness of only 0.3 mm. Such thin flat conductors can easily be embedded between the individual glass panes in the thermoplastic adhesive layer.

The use of flat conductors for contacting electrically functional layers is not restricted to the vehicle sector alone. As known from DE199 60 450 C1, flat conductors are also used in the construction sector. In composite or insulating glass panes, foil conductors are used for electrical contacting of integrated electrical components such as voltage-controlled electrochromic layers, solar cells, heating wires, alarm loops, or the like.

Also known is the use of flat conductors in composite panes with electro-optical functional elements. These are flat structures with electrically adjustable optical properties of an active layer. In other words, the optical properties of the active layer and in particular its transparency, scattering behavior, or luminosity can be controlled by an electrical voltage. Examples of electro-optical functional elements are SPD functional elements (SPD=suspended particle device), known, for example, from EP 0876608 B1 and WO 2011033313 A1, and PDLC functional elements (PDLC=polymer dispersed liquid crystal), known, for example, from DE 102008026339 A1.

Electro-optical functional elements, such as SPD or PDLC functional elements, are commercially available as multilayer film, wherein the active layer is arranged between two surface electrodes that are used to apply a voltage for controlling the active layer. Generally, the two surface electrodes are arranged between two carrier films, typically made of PET. Commercially available multilayer films are also covered on both sides with a protective film made of polypropylene or polyethylene that serves to protect the carrier films against soiling or scratching.

During manufacture of the composite pane, the functional element is cut from the multilayer film in the desired size and shape and inserted between the films of an intermediate layer, by means of which two glass panes are laminated to one another to form the composite pane.

Windshields with electrically adjustable sun visors, known, for example, from DE 102013001334 A1, DE 102005049081 B3, DE 102005007427 A1, and DE 102007027296 A1, are a typical application.

Usually, a pane with a complete connection element and a connection region for tool-free connection to further control electronics is required from the manufacturer of the pane.

The electrical contacting of electro-optical functional elements is usually done via bus bars, which are applied to the surface electrodes in the edge region of the functional element and make electrically conductive contact therewith. The bus bars extend a short distance along the surface electrode in order to create a good electrical connection. By connecting the bus bars to an external voltage source, typically via flat conductors attached on the bus bars, a voltage is applied to the surface electrodes and the active layer of the functional element is controlled or switched.

In a typical embodiment, the bus bar is arranged completely on the associated surface electrode, often in the form of an electrically conductive imprint made of, for example, silver, and soldered to a further electrically conductive structure for its contacting, for example, a flat conductor that is arranged at an angle of 90° to the bus bar and routed out of the composite pane laterally. Disadvantageous in this procedure is the risk of damage to the surface electrode when soldering the electrically conductive structure to the bus bar in the region of the surface electrode.

In contrast, the object of the present invention consists in providing an improved connection assembly having a composite pane and an electro-optical functional element, with which there is no risk of damage to the surface electrodes from soldering the applied bus bar to electrically conductive structures. In addition, it should be possible to produce the connection assembly simply, economically, and efficiently.

This and further objects are accomplished according to the invention by a connection assembly in accordance with claim 1. Preferred embodiments of the invention are apparent from the subclaims. A method for the production and the use of the connection assembly are apparent from the coordinate claims.

The connection assembly according to the invention comprises a composite pane composed of a first pane and a second pane that are joined to an intermediate layer, as well as an electro-optical functional element with an (electro-optical) active layer arranged between two surface electrodes, which functional element is arranged between the first pane and the second pane.

A single bus bar is provided in each case for electrical contacting of the two surface electrodes. The bus bars are strip-shaped in each case and are made of an electrically conductive material. The bus bars are prefabricated strips that are electrically conductingly connected to the associated surface electrode. Each surface electrode is electrically conductingly connected to only one bus bar, i.e., to a one-piece or integrated bus bar, which is folded over and routed out of the composite pane.

In contrast to the conventional procedure, it is therefore unnecessary to provide, per surface electrode, a bus bar and another electrically conductive structure for contacting the bus bar that are soldered together in the region of the surface electrode. As a result, material, costs, and time can be saved at the time the production of the connection assembly. In addition, there is no danger of damaging the surface electrode due to the soldering of the bus bar to the electrically conductive structure.

The bus bars are generally elongated and have, along their direction of extension, two ends. The bus bars are in each case flat conductors, i.e., their width is considerably greater than their thickness. The bus bars are in each case thin enough (i.e., the thickness is low enough) that they are flexible and bendable and, in particular, can be folded over.

The bus bars are in each case mounted flat on the associated surface electrode. This is advantageous in terms of simple application of the bus bars. The application of the bus bars on the surface electrodes can be done, in particular, by placement, soldering, or gluing.

The bus bars are preferably implemented in each case as strips of an electrically conductive foil, in particular of a metal foil. Advantageously, the metal foil contains or is made of a copper foil, an aluminum foil, a stainless-steel foil, a tin foil, a gold foil, or a silver foil. The metal foil can also contain or be made of alloys with the metals mentioned. The metal foil can advantageously be tinned in some sections or completely. This is particularly advantageous in order to achieve good solderability along with corrosion protection.

The bus bars advantageously have in each case a thickness of 10 μm to 500 μm, preferably of 30 μm to 300 μm, and in particular of 50 μm to 150 μm. Such thin bus bars are particularly flexible and can be readily laminated in composite panes and routed out of them. Bus bars made of electrically conductive foils with these thicknesses are technically simple to produce and have an advantageous current-carrying capacity.

The bus bars can be electrically conductingly connected to the associated surface electrode, for example, via a soldering compound, via an electrically conductive adhesive or an electrically conductive adhesive tape, or by direct placement. To improve the conductive connection, a silver-containing paste can, for example, be arranged between the surface electrode and the bus bar. The bus bars are not applied to the surface electrodes by printing or by any other coating process.

The bus bars advantageously have in each case a width of 0.5 mm to 100 mm, preferably of 1 mm to 50 mm, and in particular of 10 mm to 30 mm. In conjunction with the aforementioned thicknesses, such widths are particularly suitable for achieving sufficient current-carrying capacity. The width of a bus bar can be constant or can vary.

The bus bars advantageously have in each case a length of 5 cm to 150 cm, preferably of 10 cm to 100 cm, and in particular of 50 cm to 90 cm. It goes without saying that length, width, and thickness of a bus bar can be adapted to the requirements of the respective individual case.

In the case of a bus bar, the direction of the length defines the direction of extension. The length and width directions span a first side and a second side opposite the first side. The first side can, for example, also be referred to as the top; and the second side can be referred to as the bottom of the bus bar. In each case, the bottom of the bus bar rests on the associated surface electrode. The first end and the second end are, in each case, the opposite ends of the bus bar in the direction of extension.

The bus bars include in each case a first connection region, which is applied to the associated surface electrode and thus has physical contact (i.e., direct mechanical contact) with the surface electrode or a layer arranged between the surface electrode and the bus bar (e.g., silver paste). The first connection region is situated at a first end (end region) of the bus bar. The bus bars further include in each case a second connection region, which is situated outside the composite pane. The second connection region has a contact point for an electrical connection, in particular a soldering contact point. The second connection region is situated at a second end (end region) of the bus bar.

Each bus bar is folded over at at least one point (fold region). This means that, beyond the first connection region, the bus strip is raised from its plane of extension and routed around such that the first side (top) of a part of the bus bar faces the first side (top) of another part of the bus bar, and, in particular, rests on it.

Each bus bar can thus be divided into two sections: a first section (bus bar section) that extends from the first connection region to the location of the fold, and a second section (bus bar section) that extends from the location of the fold to the second connection region. The direction of extension of the bus bar in the first section deviates, due to the fold, from the direction of extension of the bus bar in the second section. The folding of the first and second section of a bus bar is done at an angle α (alpha). The angle α indicates the deviation of the direction of extension of the bus bar in the first and the second section, respectively. The angle α (alpha) is preferably 10° to 170°, particularly preferably 45° to 135°, even more preferably 60° to 120°, and in particular 80° to 100°. The first and the second section form, for example, an angle α of 90°. The surface normal of the first section of the bus bar is parallel to the surface normal of the second section of the bus bar.

In an advantageous embodiment, the fold of each bus bar is not sharp edged. Preferably, the fold has a radius of curvature r of 0.1 mm to 100 mm, preferably of 0.5 mm to 10 mm, and in particular of 1 mm to 5 mm. This avoids damage and an increase in the electrical resistance as could be the case with a sharp edge bend.

The two bus bars can be connected to two voltage connections, also called poles (positive or negative pole).

In an advantageous embodiment, the first connection region of a respective bus bar extends along a side edge of the electro-optical functional element (this usually corresponds to a pane edge of the composite pane). The length of the first connection region of a respective bus bar is, for example, at least 10%, at least 20%, or at least 30% of the length of the side edge of the functional element. For example, the length of the first connection region of a respective bus bar can even be less than 50% of the length of the side edge of the functional element.

Advantageously, the two bus bars contact the two surface electrodes at one and the same side edge and are routed out of the composite pane at one and the same pane edge.

The electro-optical functional element is preferably a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be advantageously processed. The functional element is advantageously protected by the carrier films against damage, in particular, corrosion. The multilayer film contains, in the order indicated, at least one first carrier film, a first surface electrode, an active layer, a second surface electrode, and a second carrier film.

Functional elements as multilayer films are commercially available. The functional element to be integrated is typically cut out of a multilayer film with larger dimensions in the desired shape and size. This can be done mechanically, for example, with a knife. In an advantageous embodiment, the cutting is done by means of a laser. It has been demonstrated that the side edge is more stable in this case than with mechanical cutting. With mechanically cut side edges, there can be a risk that the material will pull back, which is visually conspicuous and negatively affects the aesthetics of the pane.

The first surface electrode and the second surface electrode are in each case formed by an electrically conductive layer. These electrically conductive layers contain at least a metal, a metal alloy, or a transparent conductive oxide, preferably a transparent conductive oxide, and have a thickness of 10 nm to 2 µm. The surface electrodes are preferably transparent. Here, "transparent" means permeable to electromagnetic radiation, preferably electromagnetic radiation of a wavelength of 300 nm to 1300 nm, and, in particular, to visible light. Electrically conductive layers are known, for example, from DE 20 2008 017 611 U1, EP 0 847 965 B1, or WO2012/052315 A1. They typically contain one or more, for example, two, three, or four electrically conductive, functional individual layers. The functional individual layers preferably contain at least one metal, for example, silver, gold, copper, nickel, and/or chromium, or a metal alloy. The functional individual layers particularly preferably contain at least 90 wt.-% of the metal, in particular at least 99.9 wt.-% of the metal. The functional individual layers can be made of the metal or the metal alloy. The functional individual layers particularly preferably contain silver or a silver-containing alloy. Such functional individual layers have particularly advantageous electrical conductivity with, at the same time, high transmittance in the visible spectral range. The thickness of a functional individual layer is preferably from 5 nm to 50 nm, particularly preferably from 8 nm to 25 nm. In this thickness range, advantageously high transmittance in the visible spectral range and particularly advantageous electrical conductivity are achieved.

In principle, the surface electrodes can be formed by any electrically conductive layer that can be electrically contacted.

Preferably, the first carrier film and/or the second carrier film contain at least one polymer that does not fully melt in the autoclave process, preferably polyethylene terephthalate (PET). Particularly preferably, the first and the second carrier film are made of a PET film. This is particularly advantageous in terms of the stability of the multilayer film. However, the carrier films can also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene-propylenes, polyvinyl fluoride, and/or ethylene tetrafluoroethylene. The thickness of each carrier film is preferably from 0.1 mm to 1 mm, particularly preferably from 0.1 mm to 0.2 mm. The carrier films are preferably transparent. The surface electrodes are preferably arranged on one surface of the carrier film, i.e., on exactly one of the two sides of the carrier film (i.e., on its front side or its rear side). The carrier films are oriented in the layer stack of the multilayer film such that the surface electrodes are arranged adjacent the active layer.

In the context of the invention, the term "electrically adjustable optical properties" means those properties that are infinitely adjustable, but also those that can be switched between two or more discrete states.

In addition to the active layer and the surface electrodes, the functional element can have other layers known per se, for example, barrier layers, blocking layers, antireflection layers, protective layers, and/or smoothing layers.

The functional element is integrated between the first pane and the second pane of the composite pane via an intermediate layer. The intermediate layer preferably comprises a first thermoplastic laminating film, which bonds the functional element to the first pane, and a second thermoplastic laminating film, which bonds the functional element to the second pane. Typically, the intermediate layer is formed by at least the first and the second thermoplastic laminating film, which are arranged flat atop one another and are laminated to one another, with the functional element inserted between the two layers. The regions of the laminating films overlapping the functional element then form the regions that bond the functional element to the panes. In other regions of the pane where the thermoplastic laminating films make direct contact, they can fuse during lamination such that the two original layers are no longer discernible and, instead, there is a homogeneous intermediate layer.

A thermoplastic laminating film can, for example, be formed by a single thermoplastic film. A thermoplastic laminating film can also be formed from sections of different thermoplastic films whose side edges are adjacent. In addition to a first thermoplastic laminating film or a second thermoplastic laminating film, additional thermoplastic laminating films can also be present. These can, if need be, also be used for embedding additional films comprising functional layers, for example, infrared-reflecting layers or acoustically damping layers.

The thermoplastic laminating films can also include tinted or colored regions. Such films can be obtained, for example, by coextrusion. Alternatively, an untinted film section and a tinted or colored film section can be combined to form a thermoplastic laminating film. The tinted or colored region can be homogeneously colored or tinted, i.e., it can have location-independent transmittance. However, the tinting or coloration can also be inhomogeneous; in particular, a transmittance gradient can be produced.

In a preferred embodiment, the functional element, more precisely the side edges of the functional element, are circumferentially surrounded by a thermoplastic frame film. The frame film is implemented like a frame with a cutout into which the functional element is inserted. The thermoplastic frame film can be formed by a thermoplastic film in which the cutout had been made by cutting. Alternatively, the thermoplastic frame film can also be composed of a plurality of film sections assembled around the functional element. Thus, the intermediate layer is formed, in a preferred embodiment, from a total of at least three thermoplastic laminating films arranged flat one atop another, wherein the frame film, as the middle layer, has a cutout in which the functional element is arranged. During production, the thermoplastic frame film is arranged between the first and the second thermoplastic laminating film, with the side edges of all thermoplastic films preferably situated congruently. The thermoplastic frame film preferably has roughly the same thickness as the functional element. This compensates for the local difference in thickness of the composite pane, which is introduced by the locally limited functional element such that glass breakage during lamination can be avoided.

Automotive glazings, in particular windshields, rear windows, and roof panels, usually have a surrounding peripheral masking print made of an opaque enamel, which serves in particular to protect the adhesive used to install the pane against UV radiation and to visually conceal it. This peripheral masking print is preferably used to also cover the edges of the functional element, which are situated in the edge region of the glazing. The bus bars as well as the necessary electrical connections are also placed in the region of the masking print.

The first thermoplastic laminating film and the second thermoplastic laminating film, as well as, optionally, the thermoplastic frame film, preferably contain at least polyvinyl butyral (PVB), ethylene vinyl acetate (EVA), and/or polyurethane (PU), particularly preferably PVB.

The thickness of each thermoplastic laminating film as well as the frame film is preferably from 0.2 mm to 2 mm, particularly preferably from 0.3 mm to 1 mm, in particular from 0.3 mm to 0.5 mm, for example, 0.38 mm.

The first pane and the second pane are preferably made of glass, particularly preferably soda lime glass, as is common for window panes. However, the panes can also be made of other types of glass, for example, quartz glass, borosilicate glass, or aluminosilicate glass, or of rigid clear plastics, for example, polycarbonate or polymethyl methacrylate. The panes can be clear or also tinted or colored. If the composite pane is used as a windshield, it should have sufficient light transmittance in the central viewing region, preferably at least 70% in the main viewing region A according to ECE-R43.

The outer pane, the inner pane, and/or the intermediate layer can have other suitable coatings that are known per se, for example, antireflection coatings, nonstick coatings, antiscratch coatings, photocatalytic coatings, or solar protection coatings or low-E coatings.

The thickness of the first pane and the second pane can vary widely and thus be adapted to the requirements in the individual case. The first pane and the second pane preferably have thicknesses from 0.5 mm to 5 mm, particularly preferably from 1 mm to 3 mm.

The invention also includes a method for producing a connection assembly according to the invention having the following steps:
 a) Providing an electro-optical functional element,
 b) Applying bus bars on the two surface electrodes and folding the bus bars over,
 c) Laminating the composite pane, wherein the two bus bars are in each case routed out of the composite pane.

The functional element is preferably provided in the form of a multilayer film comprising, in this order, a first carrier film, an active layer, and a second carrier film, with the surface electrodes placed on the surfaces of the carrier films facing the active layer. The advantage of a multilayer film with electrically switchable optical properties resides in simple production of the glazing. The actual functional element is advantageously protected by the carrier films against damage, in particular corrosion, and can even be provided in relatively large quantities before the production of the glazing, which can be desirable for economic and production engineering reasons. During production of the composite pane, the multilayer film can simply be placed in the composite, which is then laminated by conventional methods.

The invention also includes the use of a connection assembly according to the invention as a building glazing or vehicle glazing, preferably as a vehicle glazing, in particular as a windshield or roof panel of a motor vehicle.

The various embodiments of the invention can be implemented individually or in any combinations. In particular, the features mentioned above and those to be explained in the following can be used not only in the combinations indicated, but also in other combinations or in isolation, without departing from the scope of the present invention.

The invention is explained in detail in the following using exemplary embodiments, with reference to the accompanying figures. They depict, in simplified, not-to-scale representation.

Figure 1:
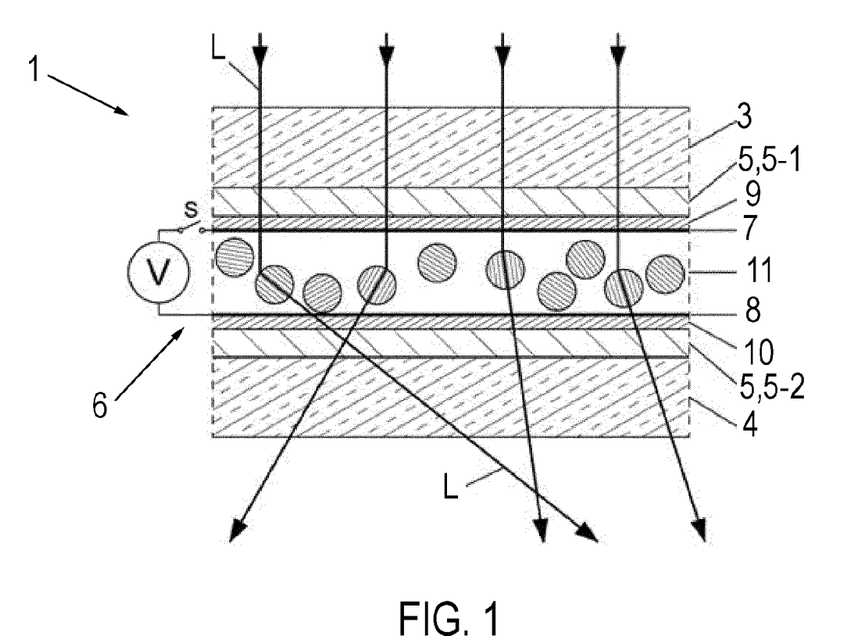
FIG. 1 a schematic sectional view of a connection assembly having a PDLC functional element in the nontransparent state, FIG. 2 a schematic sectional view of the connection assembly of FIG. 1 having a PDLC functional element in the transparent state, FIG. 3A-3C perspective views of a PDLC functional element according to the invention and its electrical contacting in the connection assembly of FIGS. 1 and 2, FIG. 4 a flow chart of a method according to the invention for producing a connection assembly according to the invention.
Figure 2:
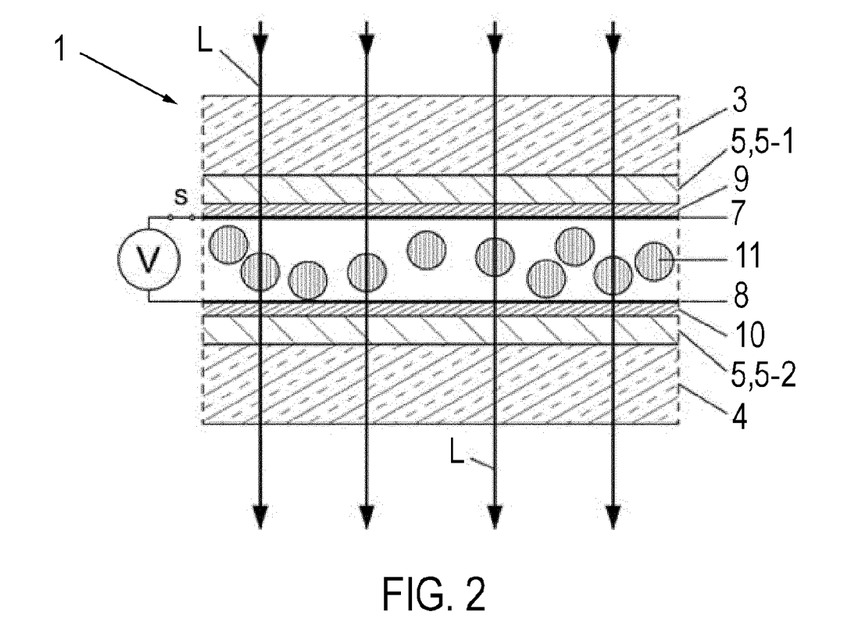

Reference is first made to FIGS. 1 and 2, in which a connection assembly having a composite pane 2, designated overall with the reference number 1, is illustrated schematically using a sectional view perpendicular to the plane of the pane. The composite pane 2, implemented here, for example, as a windshield of a motor vehicle, comprises a first pane 3, which serves as an outer pane, and a second pane 4, as an inner pane. The inner pane is the pane facing the vehicle interior, while the outer pane faces the vehicle's surroundings. The two panes 3, 4 are made, for example, of soda lime glass. The two panes 3, 4 are firmly bonded to one another by a thermoplastic intermediate layer 5.

The composite pane 2 is equipped with an electro-optical functional element 6, which is, here, for example, a PDLC functional element. For example, the PDLC functional element serves as an electrically adjustable sun visor, installed in a region above the central viewing region B (as defined in ECE-R43). The PDLC functional element is formed by a commercially available PDLC multilayer film that is embedded in the intermediate layer 5. The intermediate layer 5 comprises a total of three thermoplastic laminating films, formed in each case by a thermoplastic film with a thickness of, for example, 0.38 mm made of PVB. FIGS. 1 and 2 depict only a first thermoplastic laminating film 5-1, which is bonded to the first pane 3, and a second thermoplastic laminating film 5-2, which is bonded to the second pane 4. The interposed thermoplastic frame film, which is not shown in FIGS. 1 and 2, has a cutout, into which the cut-to-size PDLC multilayer film is inserted with a precise fit, i.e., flush on all sides. The third thermoplastic laminating film thus forms, so to speak, a type of passe-partout for the functional element 6, which is thus encapsulated all around in thermoplastic material and is protected thereby.

The electrically adjustable functional element 6 is a commercially available multilayer film consisting of an active layer 11 between two surface electrodes 7, 8 and two carrier films 9, 10. The active layer 11 contains a polymer matrix with liquid crystals dispersed therein, which align themselves as a function of the electrical voltage applied to the surface electrodes 7, 8, by which means the optical properties can be adjusted. The carrier films 9, 10 are made, for example, of PET and have a thickness of, for example, 0.125 mm. The carrier films 9, 10 are provided in each case with a coating of ITO with a thickness of roughly 100 nm facing the active layer 11, by which means the first surface electrode 7 is formed on the first carrier film 9 and the second surface electrode 8 is formed on the second carrier film 10.

When no voltage is applied, the liquid crystals are aligned in a disorderly manner, resulting in strong scattering of the light L passing through the active layer 11. This state is illustrated in FIG. 1. When a voltage S is applied to the surface electrodes 19, 20, the liquid crystals align themselves in a common direction and the transmittance of light L through the active layer 11 is increased. The PDLC functional element acts not so much by reducing the total transmittance but by increasing the scattering. This state is illustrated in FIG. 2.

Figure 3A:
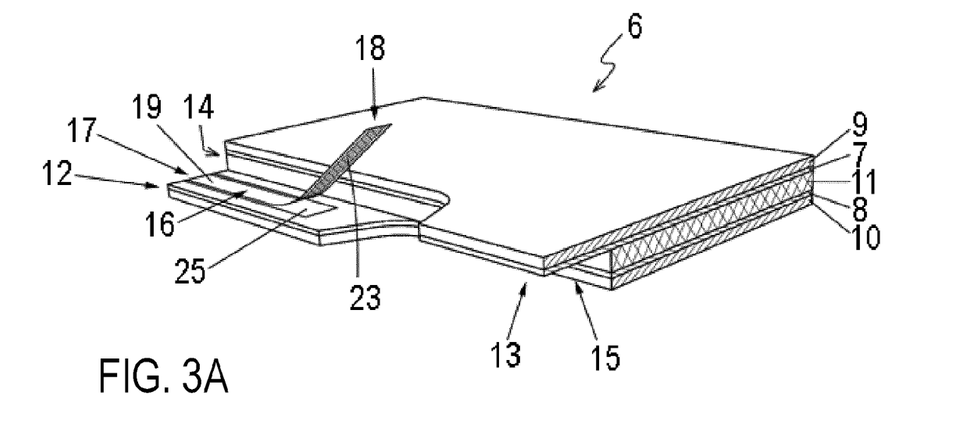
Figure 3B:
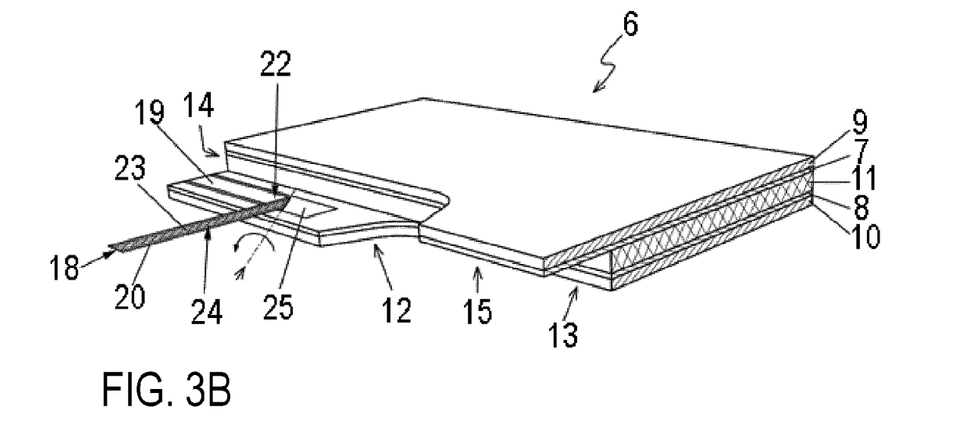
Figure 3C:
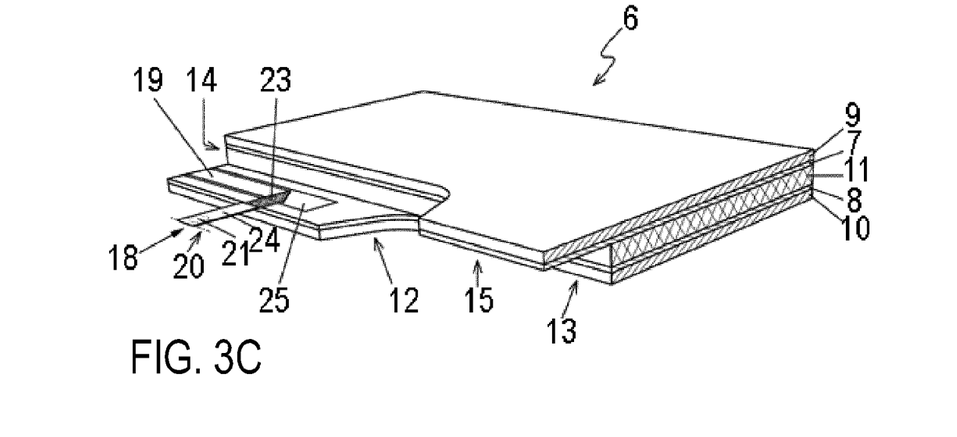

The two surface electrodes 7, 8 can be connected in each case to the on-board electrical system via a single bus bar, which will be explained in greater detail below. FIG. 3A to 3C explain the electrical connection of the functional element 6 in each case using a prospective view. To simplify the illustration, the intermediate layer 5 and the two individual panes 3, 4 of the connection assembly 1 are not shown.

Consider FIG. 3A first. As can be discerned in FIG. 3A, a longitudinal edge (side edge) of the functional element 6 is provided with two connection zones 12, 13, which are used for the electrical connection of the associated surface electrode 7, 8.

The first carrier film 9 and the first surface electrode 7 applied thereon as well as the active layer 11 have, along the longitudinal edge, a common first cutout 14, which extends to the second carrier film 10 with the second surface electrode 8 applied thereon. The second surface electrode 8 is, consequently, accessible from the side of the active layer (here, from above). The second carrier film 10 and the second surface electrode 8 form, in the region of the first cutout 14, a first connection zone 12. In a corresponding manner, the second carrier film 10 and the second surface electrode 8 applied thereon as well as the active layer 11 have, along the same longitudinal edge, a common second cutout 15, which extends to the first carrier film 9 and the first surface electrode 7 applied thereon. The first surface electrode 7 is, consequently, accessible from the side of the active layer (here, from below). The first carrier film 9 and the first surface electrode 7 form a second connection zone 13 in the region of the second cutout 15.

Each connection zone 12, 13 is provided with a single bus bar 16. In FIG. 3A to 3C, due to the perspective representation, only the first connection zone 12 is discernible in detail. The two connection zones 12, 13 are arranged laterally offset along the longitudinal edge of the functional element 18 and are formed in the same way, with the first connection zone 12 facing the first surface electrode 7 and the second connection zone 13 facing the second surface electrode 8. Accordingly, the description of the first connection zone 12 also suffices, with the statements regarding the first connection zone 12 applying analogously to the second connection zone 13.

Accordingly, a bus bar 16 with an elongated structure is applied on the first connection zone 12. The bus bar 16 is implemented in the form of a strip made of an electrically conductive material, in this case, a metal foil strip, for example, made of silver or copper foil. The bus bar 16 is thin (i.e., the thickness is so low) that it is flexible and bendable and, in particular, can be folded over. The bus bar 16 has a first connection region 19 at a first end 17 (end region). The first connection region 19 is applied on the second surface electrode 8 of the first connection zone 12 and makes physical contact with the second surface electrode 8 or, here, for example, with a layer of silver-containing paste 26, which is arranged between the first connection region 19 of the bus bar 16 and the second surface electrode 8 and improves the electrical connection. The bus bar 16 is electrically conductively connected to the second surface electrode 8 in the first connection region 19, for example, via a soldering compound, via an electrically conductive adhesive or an electrically conductive adhesive tape or simply by direct placement. As already mentioned, a silver-containing paste 26, for example, is arranged between the second surface electrode 8 and the bus bar 16 to improve the conductive connection. However, this is optional and can be omitted. In the present exemplary embodiment, the bus bar 16 is fixedly connected to the second surface electrode 8 via an electrically conductive adhesive 23, which is applied on the second side (bottom) of the bus bar 16.

The bus bar 16 has, for example, a thickness of 10 μm to 500 μm and a width of 0.5 mm to 100 mm as well as a length of 5 cm to 150 cm. Such a bus bar 16 is particularly flexible and can easily be laminated into the composite pane 2.

The first connection region 19 of the bus bar 16 extends along the longitudinal edge (side edge) of the functional element 6 and, here, along the elongated first connection zone 13.

The bus bar 16 further includes a second connection region 20 outside the composite pane 2, which has a contact point 21 for an electrical connection, in particular a solder contact point. The contact point 21 is arranged on the second side (bottom) of the bus bar 16. For this purpose, the adhesive 23 is removed on the part of the bus bar 16 routed out of the composite pane 2, with the bottom directed upward.

Between the first connection region 19 and the second connection region 20, the bus bar is folded over at a point, referred to in the following as the fold region 22. The fold region 22 is situated within the composite pane 2 in the region of the first connection zone 12, i.e., in physical contact with the second surface electrode 8. The direction of extension of a first bus bar section 24 before the fold region 22 and the direction of extension of a second bus bar section 25 after the fold region 22 are arranged at an angle of 90°. The surface normals of the two bus bar sections 24, 25 are parallel. The fold region 22 has a radius of curvature r from 0.1 mm to 100 mm, which avoids damage and an increase in the electrical resistance, as could be the case with a sharp-edged bend.

FIG. 3A depicts a situation in which the bus bar 16 with its first connection region 19 is applied on the second surface electrode 8, wherein a section of the bus bar 16 is raised for folding. FIG. 3B depicts the bus bar 16 in the folded-over state, wherein the conductive adhesive 23 is still on the second side (bottom) of the bus bar 16. FIG. 3 3C [sic] depicts a situation in which the conductive adhesive 23 has been removed from the part of the bus bar 16 situated outside the composite pane 2 such that the contact point 21 can be connected to an electrical connection as a solder contact point.

The two bus bars 16 are routed out of the composite pane 2 at the same longitudinal edge of the composite pane 2 and can, for example, be connected to two voltage terminals of opposite polarity.

The part of each bus bar 16 situated outside the composite pane 1 can be provided with an insulation layer, made, for example, of polyimide, which is not shown in the figures.

Figure 4:
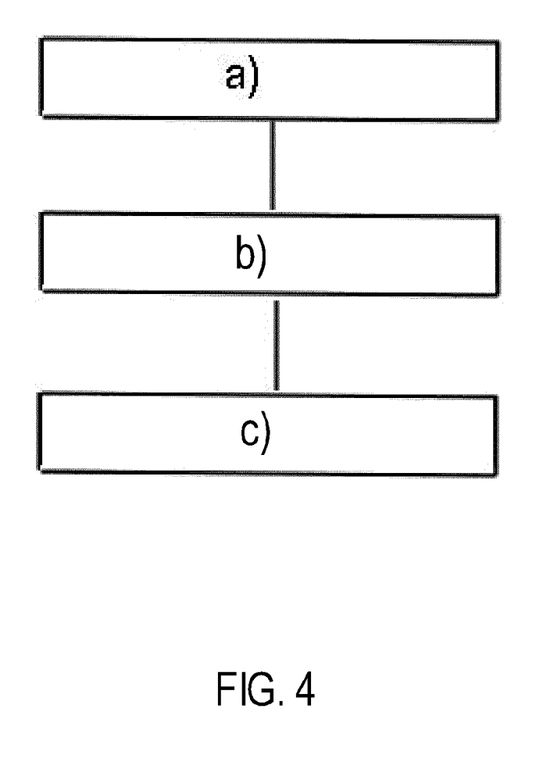

FIG. 4 depicts a flow chart of a method according to the invention for producing the connection assembly 1 according to the invention.

The method includes at least the following steps:
a) Providing an electro-optical functional element,
b) Applying bus bars on the two surface electrodes and folding the bus bars over,
c) Laminating the composite pane, wherein the two bus bars are in each case routed out of the composite pane.

It follows from the above statements that the invention enables a simple, economical, and material-saving electrical connection of the surface electrodes of a functional element in a composite pane, wherein each surface electrode has only a single bus bar, which is folded over. There is no risk of damaging the surface electrodes by soldering an electrically conductive structure to a bus bar of a surface electrode.

REFERENCE CHARACTERS 1 connection assembly
2 composite pane
3 first pane
4 second pane
5 intermediate layer
5-1, 5-2 laminating film
6 functional element
7 first surface electrode
8 second surface electrode
9 first carrier film
10 second carrier film
11 active layer
12 first connection zone
13 second connection zone
14 first cutout
15 second cutout
16 bus bar
17 first end
18 second end
19 first connection region
20 second connection region
21 contact point
22 fold region
23 adhesive
24 first bus bar section
25 second bus bar section
26 silver-containing paste

The invention claimed is:

1. A connection assembly, comprising:
a composite pane composed of a first pane and a second pane, which are connected to an intermediate layer,
an electro-optical functional element having an active layer arranged between two surface electrodes, which electro-optical functional element is arranged between the first pane and the second pane,
wherein a single flexible bus bar in the form of a strip is applied on each of the two surface electrodes, wherein the single flexible bus bar is folded over and routed out of the composite pane.

2. The connection assembly according to claim 1, wherein an angle between a direction of extension of a first bus bar section before a fold region and a direction of extension of a second bus bar section after the fold region is from 10° to 170°.

3. The connection assembly according to claim 2, wherein the two single flexible bus bars are routed out of the composite pane perpendicular to a pane edge.

4. The connection assembly according to claim 1, wherein the two single flexible bus bars are routed out of the composite pane at one and a same pane edge.

5. The connection assembly according to claim 1, wherein the two single flexible bus bars each a first connection region that is directly connected to the associated surface electrode or to a layer arranged between the surface electrode and the single flexible bus bar, wherein the first connection region extends along a side edge of the electro-optical functional element.

6. The connection assembly according to claim 1, wherein the two single flexible bus bars are each implemented as strips of an electrically conductive foil.

7. The connection assembly according to claim 1, wherein the two single flexible bus bars each have a thickness of 10 µm to 500 µm and/or a width of 0.5 mm to 100 mm and/or a length of 5 cm to 150 cm.

8. The connection assembly according to claim 1, wherein the two single flexible bus bars each have a second connection region arranged outside the composite pane for the electrical connection to an external connection.

9. The connection assembly according to claim 1, wherein the two single flexible bus bars are each applied to the associated surface electrode by placement, a soldering compound, an electrically conductive adhesive, or an electrically conductive adhesive tape.

10. The connection assembly according to claim 1, wherein the two single flexible bus bars are each folded over without sharp edges, wherein the fold has a radius of curvature r of 0.1 mm to 100 mm.

11. A method for producing a connection assembly according to claim 1, comprising:
a) providing an electro-optical functional element,
b) applying bus bars to the two surface electrodes and folding the bus bars over,
c) laminating the composite pane, wherein the two bus bars are each routed out of the composite pane.

12. A method comprising providing a connection assembly according to claim 1 in a vehicle or in a construction, in a furniture, an electrical appliance, or a decorative item in a multi-pane composite glass pane.

13. The connection assembly according to claim 2, wherein the angle is 90°.

14. The connection assembly according to claim 6, wherein the electrically conductive foil is a metal foil.

15. The connection assembly according to claim 8, wherein the second connection region is a soldering contact point.

* * * * *